R. MOLDENKE.
UTILIZATION OF ALUNITE.
APPLICATION FILED MAY 1, 1918.
1,282,273.
Patented Oct. 22, 1918.
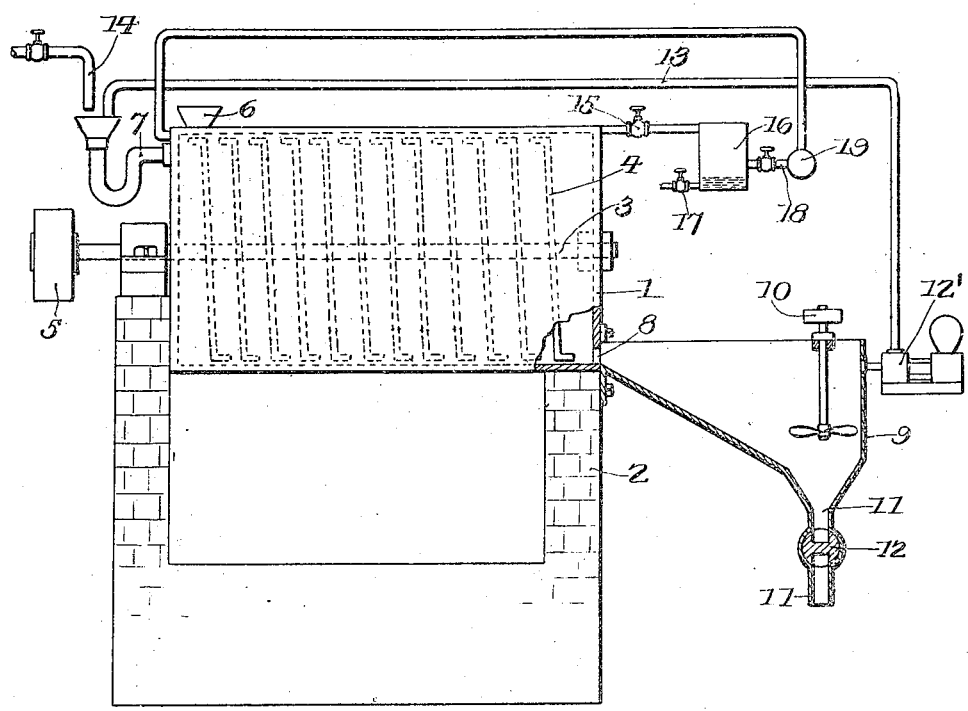
Inventor
Richard Moldenke
By W. P. McElroy
Attorney

UNITED STATES PATENT OFFICE.

RICHARD MOLDENKE, OF WATCHUNG, NEW JERSEY.

UTILIZATION OF ALUNITE.

1,282,273.

Specification of Letters Patent.

Patented Oct. 22, 1918.

Application filed May 1, 1918. Serial No. 231,865.

*To all whom it may concern:*

Be it known that I, RICHARD MOLDENKE, a citizen of the United States, residing at Watchung, in the county of Somerset and State of New Jersey, have invented certain new and useful Improvements in the Utilization of Alunite, of which the following is a specification.

This invention relates to the utilization of alunite; and it comprises a method of utilizing and purifying alunite wherein said alunite in a finely comminuted state is digested in a closed vessel at the ordinary pressure with sufficient concentrated sulfuric acid to form a pasty mass, the digestion being at such temperature as to cause a free evolution of fumes from said acid, such fumes being retained in contact with the mass by the inclosed vessel, and the mass after the digestion being allowed to settle to separate the excess of sulfuric acid from the converted mineral; all as more fully hereinafter set forth and as claimed.

"Alunite" is the commercial name for a number of native minerals or materials ranging from the mineralogical alunite, which is a basic double sulfate of aluminum and potassium, to various basic sulfates of alumina (aluminum sulfates) nearly free from potash or other alkalis. Much of the alunite contains more or less soda replacing potash. Alunite is found in many localities in this country, important deposits being in Utah. It is also found in Arizona, Nevada, California, etc. In many of these deposits the mineral is in crystalline form, some of it being coarsely crystalline and resembling calcite, while in others it is fine grained or amorphous. Some varieties, more commonly known as "alum stone" are really more in the nature of incrustations in or on other rocky materials. None of these materials is pure; and all contain more or less silica, iron, etc. Alunite is not soluble in water and is not materially affected by most reagents. The usual method of utilization is to roast it so as to expel the sulfuric acid, wholly or partially, and leach. This gives an extract containing potassium sulfate, alum or alum together with sulfate of alumina (aluminum sulfates), as the case may be, leaving behind more or less alumina with the iron and silica. It has been proposed to heat alunite with dilute sulfuric acid to bring the potassium sulfate and aluminum sulfate into solution but the extraction in this case is not always good. Simple roasting and digesting with water will extract part but not all of the potash as sulfate, leaving alumina in the residue mingled with whatever impurities may be present.

From its analytical composition, any variety of alunite should be largely soluble in water. Potassium sulfate and alum are soluble and sulfate of alumina may be quite basic in composition without forfeiting its solubility. But, as a matter of fact, the alunites, as stated, are insoluble in water, yielding very little thereto even at high temperatures. The materials are, so to speak, "mineralized".

I have found that by heating alunite in the presence of concentrated sulfuric acid at the ordinary atmospheric pressure but in a closed chamber to restrain dissipation of the fumes, I can readily and economically effect a complete utilization of the potash and alumina content of the alunite. The action of the acid is largely that of destroying the "mineralization" of the material and converting the potassium and aluminum sulfates into the ordinary chemical forms, soluble in water. The basic sulfate is of course converted into the normal sulfate by this operation. I find that in practice the alunite should be comminuted as finely as possible, the action being the quicker the finer the state of comminution. The operation should be conducted at a temperature at which the acid fumes freely but in a closed vessel to prevent escape of the fumes. For some reason, if the fumes be allowed to escape, the action is not as good; possibly because the mixture can be raised to a somewhat higher temperature in a closed chamber than is possible where free ventilation is allowed. Whatever the reason, the fact is that retention of the vapors of the acid in contact with the mass facilitates destruction of the mineralization. It also leads, of course, to greater economy in acid by preventing loss and it renders the operation much more convenient. On fine grinding alunite, mixing it with enough concentrated sulfuric acid to give a pasty but rather fluid consistency and heating up to a point where copious fumes are given off, the paste becomes bulky, showing that action has taken place within the mass. The addition of more sulfuric acid than that necessary to form the original rather fluid mud or paste has no advantage, although it may be done. It is necessary that the digestion be continued for some little time, the length of time requisite being the greater the coarser the material. With alunite ground to 100 mesh, on a short digestion only a portion of the mass will dissolve in water. With alunite ground to 120—150 mesh, about thirty minutes digestion with sulfuric acid at a temperature of 500°–600° F. brings all the alumina and potash into a condition soluble in water. A temperature of 500°—600° F. is a suitable one for most purposes. As this is near or above the boiling point of strong sulfuric acid, there is copious evolution of fumes and if a closed vessel be not adopted, there is a loss of acid. After the digestion is completed, the reaction product is a mixture of sulfates with the excess of the acid used. Silica and other impurities are contained in an insoluble form while the potassium and aluminum occur as sulfates soluble in water. These sulfates however are not soluble in sulfuric acid and it is convenient to transfer the reaction product to a bath of strong sulfuric acid to cool and settle. By so doing the solids are regained in compacted form and the excess of free acid is taken up by the bath. The settled solids are then leached to regain the soluble sulfates.

In the accompanying illustration I have shown, more or less diagrammatically, certain apparatus adapted for use in the performance of the described process. In this showing the figure is a transverse vertical section, certain parts being shown in elevation.

In this showing a stationary drum 1 of iron or other suitable material is mounted above and heated by a furnace chamber 2. Within the drum is rotatably mounted a shaft 3 carrying forwarding and rabbling blades 4 adapted to feed the material from end to end. Motion is imparted by pulley 5. Fine ground alunite may be introduced by hopper 6 at one end of the apparatus, sulfuric acid being introduced at the same end by means of conduit 7. The mixture of acid and alunite is stirred and agitated by the rabbling blades until it escapes through outlet 8 at the other end of the drum. In communication with this outlet is a tapering settling tank 9 provided with agitating means 10, shown as a propeller screw. The mixture of acid and sulfates passing into the settling tank deposits its sulfates as a thickened mass in the funnel bottom 11, whence the solids may be discharged from time to time by opening discharge valve 12. The acid separated in the settling joins that in the tank and is returned continuously or from time to time by means of pump 12′ and conduit 13 passing back to the sulfuric acid inlet. Fresh sulfuric acid may be introduced into the system by means of conduit 14.

In the operation of the above apparatus alunite is introduced at 6 and sulfuric acid at 7, this acid being partly fresh acid from 14 and partly once used acid from 13. The fresh acid used may be that produced in a later operation. Enough acid is added to form a fairly fluid mass; a mass which can be readily moved forward through the reaction chamber. The temperature is raised to nearly the boiling point of the acid at ordinary atmospheric pressure and evolution of vapors is copious because of the rabbling action, but no escape of these vapors is permitted, the drum 1 being closed. No particular pressure other than atmospheric however prevails within the drum. As the mass slowly passes forward through the drum, the alunite is converted into water-soluble sulfates which however do not dissolve to any extent in the excess of sulfuric acid present. The sulfuric acid in excess and the sulfates go forward to the settling tank where they are separated, the sulfates containing but little free sulfuric acid being removed at 12 while the excess of acid is sent back to be used over again. In so doing it will be perceived that there is little opportunity for loss of sulfuric acid. At the temperatures employed no substantial dissociation of $SO_3$ takes place.

The sulfates discharged at 11 may be treated in any suitable way but I ordinarily subject them to leaching with water. In the leaching vats, a solution of sulfate of potash, sulfate of sodium (if sodium be present) and sulfate of aluminum is formed. This mixture is evaporated to crystallization to recover alum and the excess of sulfate of alumina. The crystallized materials may be dried and calcined in any of the usual manners to allow extraction of potassium and sodium sulfates, leaving the alumina as practically pure oxid. It is better however to calcine in a special way.

In the calcination of sulfate of alumina or of alum, a number of things may take place according to circumstances. The various sulfates do not all break up at the same temperatures. If there be sulfate of iron present, it breaks up at a lower temperature than the sulfate of alumina and the sulfate of alumina in turn breaks up at a lower temperature than sulfate of potash. By methodical calcination, therefore, the iron may be first rendered insoluble. If the calcined mass at this stage be leached and the solubles recrystallized, a pure material will be obtained. If calcination be pushed further, the sulfate of alumina may be converted into oxid of aluminum while the potassium sulfate and sodium sulfate are not affected. If calcination be thus effected, the alkali (alkali metal sulfates) sulfates can then be leached from the mass. In the calcination of any of these sulfates at a temperature sufficient for dissociation while the sulfuric acid ($SO_3$) present is driven off, it depends wholly upon the conditions whether it is driven off as such, as $H_2SO_4$ or as a mixture of $SO_2$ and O. In calcination the same apparatus which was used for the original opening up of the material may also be used advantageously, but if it be so employed it is best to provide it with special means for regulating the composition of the atmosphere within the roasting chamber. The composition of the fumes from a dissociating sulfate depend very largely upon the character of this atmosphere.

As stated, in calcination of a sulfate the $SO_3$ may be evolved in various forms, as such or as a mixture of oxygen and sulfur dioxid. This mixture represents a loss of acid. The less $SO_3$ is contained in the gas mass above sulfates at a calcining heat, of course the easier is the calcination to expel sulfuric acid and the more rapidly it can be effected; but there is also more dissociation of the $SO_3$ itself. The most rapid expulsion of acid in calcination with the minimum of dissociation of $SO_3$ can be obtained when the atmosphere above the calcining mass consists of sulfur dioxid and oxygen in the correct proportions to form $SO_3$. In such an atmosphere, calcination takes place readily while but little dissociation of the $SO_3$ takes place. By providing the drum of the figure with a valved gas outlet 15 communicating with a collecting chamber 16 containing a little sulfuric acid (to absorb $SO_3$) and having an acid outlet 17, the $SO_3$ as it is evolved can be readily collected. In the evolution, more or less dissociation takes place forming $SO_2$ and O which do not condense. This mixture of gases may be sent by conduit 18 and fan 19 of refractory material back to the calcining chamber.

In the use of this structure, the sulfates calcined in chamber 1 lose $SO_3$, $SO_2$ and O. These go forward through 15 to 16 where the $SO_3$ is collected in sulfuric acid. The $SO_2$ and O then go back through 18 and 19 to the calcining chamber. Thereafter calcination is effected in an atmosphere of $SO_2$ and O and under phase rule principles, breaking up of sulfates is aided and dissociation of $SO_3$ is restrained and the loss of $SO_3$ as $SO_2$ and O is reduced to a minimum.

My method of roasting the sulfates in an atmosphere of controlled composition may be applied to the original alunite but I regard it as more advantageous to open up the alunite with acid in the manner stated and crystallize prior to calcination. This is for the reason that in so doing a purer alumina is obtained as a final product, while in the direct roasting of the alunite the alumina recovered is of course contaminated by all the impurities of the original alunite. The sulfuric acid used for opening up the mineral may of course be obtained in the calcination stage.

Expulsion of $SO_3$ into an atmosphere of $SO_2$ and O is as ready as it is into air; but the expelled $SO_3$ does not dissociate to the extent that it does in air or other gases.

In my method of treating alunite, while the sulfates produced in the first crystallization may be marketed as such, I find it more advantageous to calcine them as stated. In this calcination it is not necessary to remove all the water. In the calcination I obtain $SO_3$ and $H_2SO_4$ which may serve for digesting more alunite. As will be noted, in this method of operation, the process is, so to speak, self contained.

What I claim is:—

1. The process of treating alunite which comprises digesting it with concentrated sulfuric acid in a closed vessel at a temperature at which such acid emits fumes, the amount of acid being such as to form a pasty mass with such alunite and the heating being in a vessel of such construction as to maintain a body of fumes in contact with such mass.

2. In the utilization of alunite the process which comprises opening up such alunite by digestion with concentrated sulfuric acid in a closed chamber at the ordinary pressure and at a temperature at which free evolution of vapors takes place, removing the mixture of acid and converted material from the chamber, settling out the converted material from the excess of sulfuric acid, dissolving the converted material, crystallizing the sulfate from the solution and calcining such sulfates in an atmosphere of $SO_2$ and oxygen to produce sulfuric acid and alumina.

3. In the treatment of sulfate of aluminum, the process which comprises calcining such sulfate in an atmosphere of $SO_2$ and O, removing the vapors and gases, condensing out $SO_3$ and returning the $SO_2$ and O to the chamber for further use in calcination.

In testimony whereof, I affix my signature hereto.

RICHARD MOLDENKE.